United States Patent [19]

McCue

[11] Patent Number: 4,813,172
[45] Date of Patent: Mar. 21, 1989

[54] DOWNRIGGER FISHING LINE SYSTEM

[76] Inventor: Sam V. McCue, 805 Holly, Coulee Dam, Wash. 99116

[21] Appl. No.: 76,997

[22] Filed: Jul. 20, 1987

Related U.S. Application Data

[63] Continuation of Ser. No. 846,933, Apr. 1, 1986, abandoned.

[51] Int. Cl.$^4$ ............................................. A01K 91/00
[52] U.S. Cl. .................................................... 43/43.12
[58] Field of Search .............................. 43/43.12, 27.4

[56] References Cited

U.S. PATENT DOCUMENTS

| | | |
|---|---|---|
| 124,298 | 3/1972 | Trumbull . |
| 272,197 | 2/1883 | Blake . |
| 424,388 | 3/1890 | Weigel . |
| 1,078,605 | 11/1913 | Blackburn . |
| 1,355,004 | 10/1920 | Sandford . |
| 1,380,800 | 6/1921 | Haworth . |
| 1,552,230 | 11/1923 | Powers . |
| 2,085,333 | 3/1936 | Reynolds . |
| 2,482,231 | 7/1944 | White . |
| 3,281,983 | 11/1966 | Blankenbecler ................ 43/43.12 |
| 3,654,672 | 4/1972 | Bullar . |
| 3,659,370 | 5/1972 | Ritter . |
| 3,766,681 | 10/1973 | Mander ............................ 43/43.12 |
| 3,778,918 | 12/1973 | Emory, Sr. et al. . |
| 3,816,954 | 6/1974 | Bissonette ....................... 43/43.12 |
| 3,835,571 | 9/1974 | Berry . |
| 3,883,981 | 5/1975 | Bohn . |
| 3,905,148 | 9/1975 | Naone et al. . |
| 3,905,711 | 9/1975 | Rogers . |
| 3,910,524 | 10/1975 | Ireland . |
| 3,961,438 | 6/1976 | Henze et al. . |
| 3,974,589 | 8/1976 | Henze ............................... 43/43.12 |
| 4,012,863 | 3/1977 | Lori .................................. 43/43.12 |
| 4,059,333 | 11/1977 | Mixon, Jr. . |
| 4,069,611 | 1/1978 | Dusich ............................. 43/43.12 |
| 4,221,068 | 9/1980 | Roemer ........................... 43/43.12 |
| 4,261,130 | 4/1981 | Cudnohufsky . |
| 4,274,219 | 6/1981 | Way . |
| 4,313,243 | 2/1982 | Childress et al. . |
| 4,395,841 | 8/1983 | Cudnohyfsky . |
| 4,453,336 | 6/1984 | Lowden . |
| 4,520,589 | 6/1985 | Lummis ........................... 43/43.12 |

Primary Examiner—Kurt Rowan
Attorney, Agent, or Firm—Wells, St. John & Roberts

[57] ABSTRACT

An improved release assembly for releasably attaching a fishing line to a separate weighted downrigger line. The release assembly comprises an adjustable release clamp attached to a fishing line. The release clamp is releasably attached to a sleeve slidably engaged on the downrigger line. A wedge clamp is used to attach the downrigger line to a weight.

17 Claims, 3 Drawing Sheets

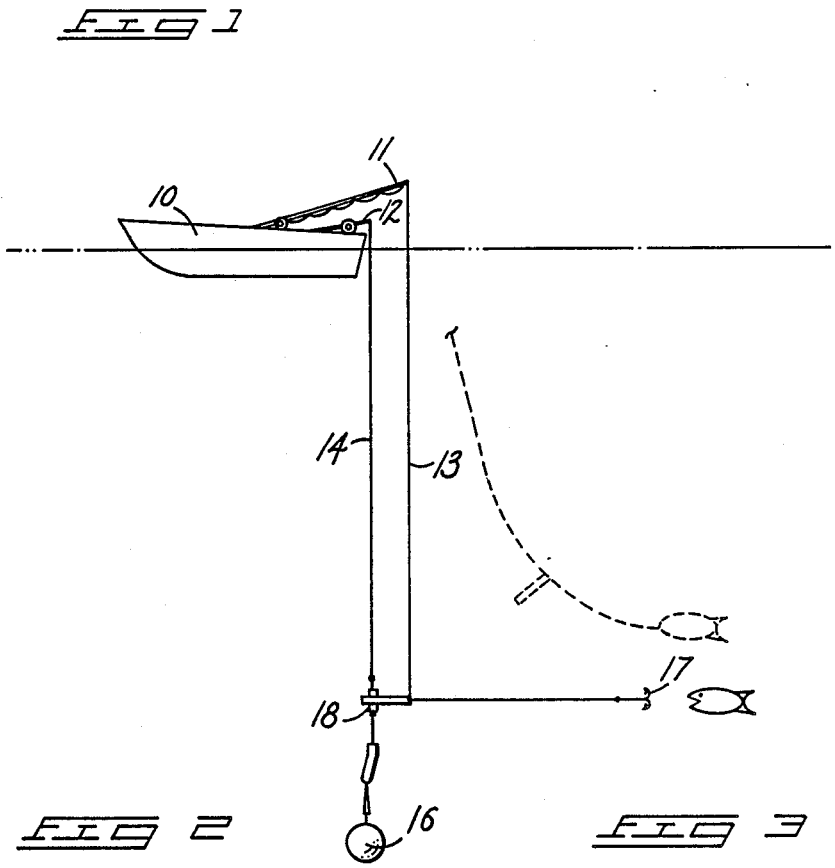
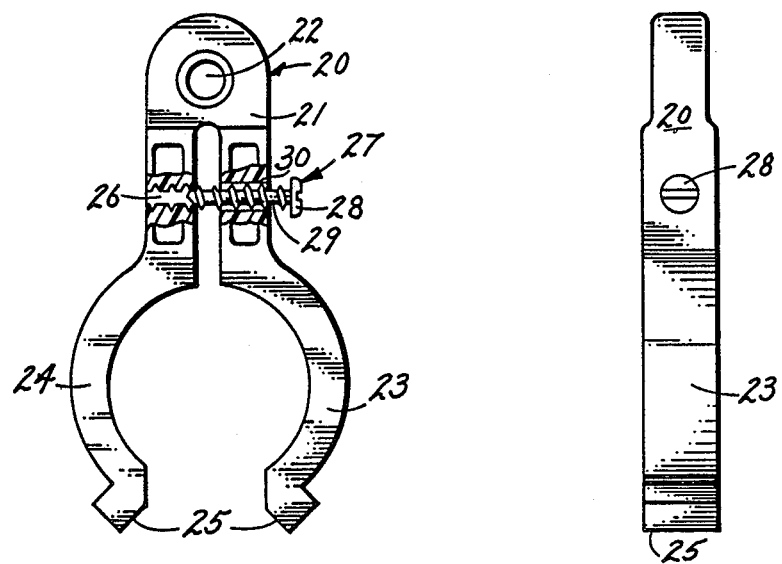

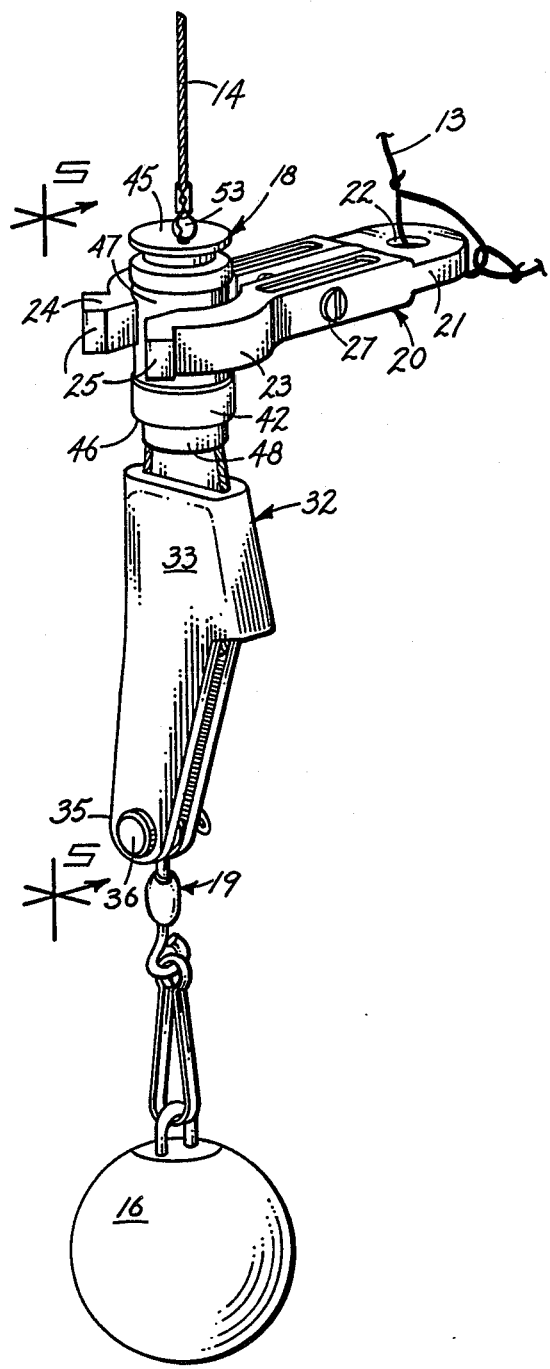
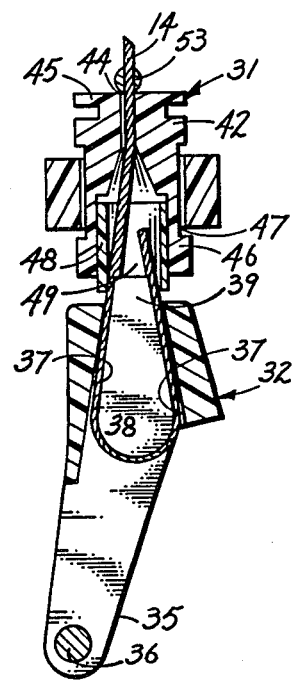
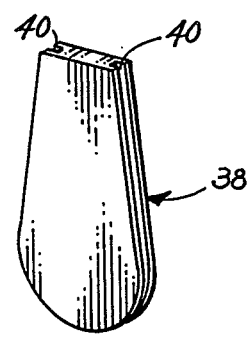

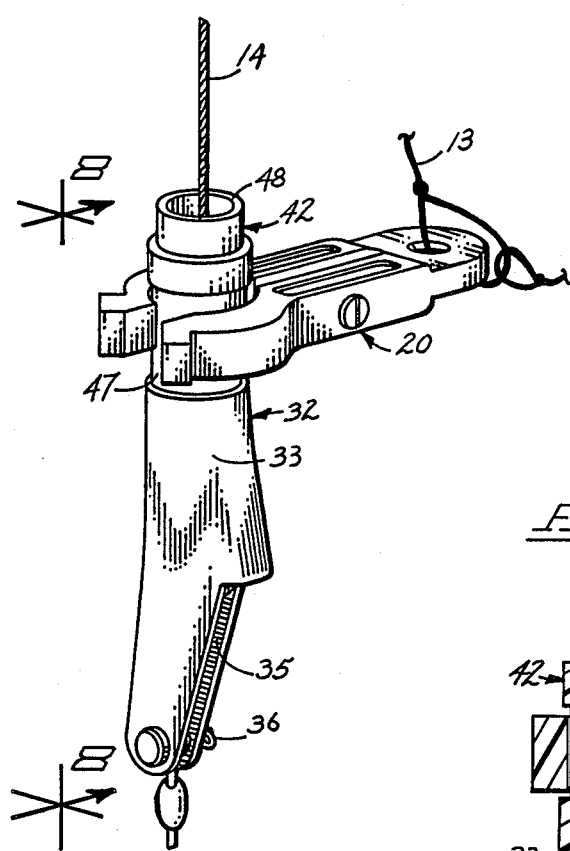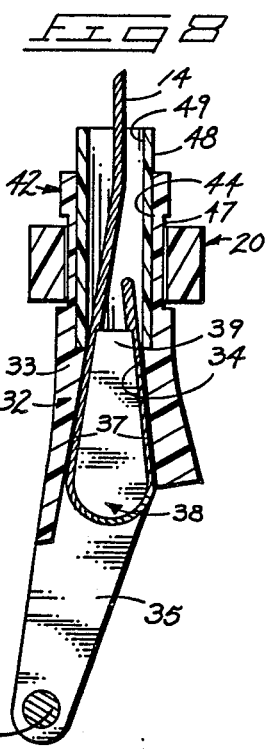

DOWNRIGGER FISHING LINE SYSTEM

This is a Continuation of Application Ser. No. 846,933 filed Apr. 1, 1986, now abandoned.

FIELD OF THE INVENTION

This invention relates to a downrigger release assembly for adjustably releasing a fishing line from a separate weighted downrigger line.

BACKGROUND OF THE INVENTION

A common method of fishing, particularly in relatively deep water, is downrigger fishing. This method involves trolling, using a weighted downrigger line which may be a wire wrap line. The weighted downrigger line has a separate releasable fishing line attached to it. The weighted downrigger line is used to hold the baited hook on the fishing line at the desired depth.

The downrigger/fishing line assembly must be designed so that the fishing line is reliably released from the weighted downrigger line when a fish strikes, as it is extremely inconvenient to have to raise the weighted downrigger line when reeling in the fish.

To this end, it is desirable that the means for attaching the fishing line to the downrigger line be easily installed, economical, and reliable. It is also desirable that the force needed to release the fishing line from the downrigger line be adjustable so that the same system can be utilized by fishermen fishing for different sizes and weights of fish.

It is also desirable to have a means for easily attaching a weight to the downrigger line, so that the downrigger line can be easily changed for a new line when the old line becomes worn.

There have been many prior attempts to develop a simple, easy to use and inexpensive release mechanism. One such example is shown in U.S. Pat. No. 4,395,841 to Cudnohufsky. The Cudnohufsky '841 patent discloses a relatively complex mechanism which requires that the fishing line be wrapped around one or more parts of the release mechanism in order for the mechanism to function.

U.S. Pat. No. 4,261,130 also to cudnohufsky discloses another type of complex mechanism for releasably attaching a fishing line to a downrigger line. In the '130 patent, in addition to attaching the release mechanism to the downrigger line at the desired spot the fishing line must be threaded through a portion of the device. While one embodiment of the invention does allow for a difference in placement of a portion of the mechanism to change the responsiveness of the device to the tension in the fishing line, the number of adjustments allowable by this means are very limited.

U.S. Pat. No. 3,883,981 to Bohn discloses a simplified release mechanism comprising a circular button through which the fishing line is attached which in turn is connected to the downrigger weight by a spring clip. This device does not provide for any tensioning adjustment. It also requires that the release button be rotated by hand several times to wrap the fishing line to prevent the fishing line from slipping through the button. The buttom is then attached to the downrigger weight by hand.

U.S. Pat. No. 4,069,611 to Dusich et al discloses a release mechanism which can be attached at any position on the downrigger line. It also provides a means for adjusting the tension required to allow the fishing line to release. However, this release mechanism itself is complex, and also requires that the fishing line be wrapped around a portion of the release mechanism.

U.S. Pat. No. 3,659,370 to Ritter discloses an adjustable release mechanism for changing the responsiveness of the release mechanism to the tension required in the fishing line to cause it to release. However, this device must be connected directly to the weight on the downrigger line and cannot be placed anywhere else on the downrigger line. In addition, the fishing line must be positioned precisely within two slots in the jaws of the mechanism for proper operation.

U.S. Pat. No. 3,778,918 to Emory, Sr. et al discloses a circular mechanism to which a spring clip may be attached. The spring clip is attached to the fishing line. There are three different diameters around which the spring clip can be attaced to provide some variation in the tension required to release from the line. This device is associated only with release of the fishing line and not with attachment of the weight to the downrigger line.

U.S. Pat. No. 3,905,148 to Naone et al discloses an adjustable release mechanism for attaching a fishing line to an outrigger rather than a downrigger line. When the fishing line is released from this device, an essential portion of the device is lost into the water and must be replaced in order for the device to be reused.

U.S. Pat. No. 4,453,336 to Lowden discloses an adjustable fish line release mechanism. This mechanism stays with the downrigger line when the fishing line is released and requires a separate device for connecting the weight to the downrigger line.

BRIEF DESCRIPTION OF THE DRAWINGS

The invention is illustrated in the accompanying drawings, in which:

FIG. 1 is a diagrammatic elevational view showing the downrigger release assembly, a downrigger line and a fishing line with the broken line portion thereof indicating the relative position of the fishing line after release;

FIG. 2 is a top elevation of the fishing line release clamp partially fragmented to show the adjustment screw threaded therethrough;

FIG. 3 is a side elevational view showing the adjustment screw;

FIG. 4 is a perspective view of a portion of the weighted downrigger line with the downrigger line release assembly installed;

FIG. 5 is a cross-sectional view taken along line 5—5 of FIG. 4;

FIG. 6 is a perspective view of the insert,

FIG. 7 is a perspective view of an alternative embodiment of the downrigger release assembly; and FIG. 8 is a cross-sectional view taken along line 8—8 of FIG. 7.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

The present invention arose out of the need for an inexpensive, long lasting, easy to install and easy to use downrigger release assembly for releasably ataching a fishing line to a separate weighted downrigger line.

Both forms of the present downrigger release assembly shown and described herein are utilized with a conventional fishing boat 10 and downrigger system illustrated in FIG. 1. Fishing boat 10 has at least one fishing rod 11 and downrigger tackle 12. Fishing line 13 extends from the fishing rod 11 downward to the fishing line release clamp 20 which is positioned on sleeve 42. The separate downrigger line 14 has attached at its end a downrigger weight 16 which is utilized to keep the fishing line 13 with bait at the desired depth when the boat is trolling.

Both forms of the downrigger release assembly 18 utilizes a release clamp 20 generally illustrated in FIGS. 2, 3 and 4. The release clamp 20 includes a body 21 having a hole 22. The fishing line 13 can be attached to release clamp 20 through hole 22. While a hole is used in the preferred embodiment, any suitable means of attaching fishing line 13 to the clamp 20 could be utilized.

Release clamp 20 also has a pair of resilient curved legs 23 and 24 extending from the body 21. Legs 23 and 24 terminate in free ends 25 which are spaced away from the body. The legs 23 and 24 extend far enough from the body 21 to allow to sleeve 42 to fit between free ends 25 and the body 21.

Legs 23 and 24 are preferably an integral part of the overall release clamp 20. Release clamp 20 can be made of any non-corrosive material which has some resiliency, but in the preferred embodiment it is an inexpensive, lightweight and long-lasting high density thermoplastic material. The leg ends 25 are suitably shaped to resiliently receive and hold sleeve 42 between them.

Release clamp 20 also has an adjusting screw 27. Screw 27 is a conventional screw having a slotted head 28 and a threaded shank 29. It is preferably made from a highly corrosion resistant material such as brass or stainless steel. Shank 29 fits through a complementary opening 30 through resilient leg 23. In the embodiment shown in FIG. 2, leg 24 has an opening 26 which is of slightly smaller diameter than opening 30, so screw 27 is self-tapped as it is turned and engaged in opening 26.

Downrigger release assembly 18 may also include a downrigger line connector 31, a first form of which is generally illustrated in FIGS. 4 and 5. The downrigger line connector 31 has a wedge clamp 32 for attaching the downrigger weight 16 to the downrigger line 14. The downrigger weight 16 is connected to one end of wedge clamp 32 by use of a clevis pin 23. Downrigger line 14 is attached at the other end of wedge clamp 32.

Wedge clamp 32 includes a housing 33. As shown in FIG. 4 and FIG. 5, housing 33 has a slot 34 extending through one end as can be seen from FIG. 5, the slot 34 has converging line engaging surfaces 37 which terminate in a narrower portion of the slot 34 at one end of the housing 33. At the opposite end of housing 33 is a clevis 35 and a clevis pin 36 which are used to attach downrigger weight 16. While the weight 16 is shown as being attached to housing 33 with a clevis 35 and and clevis pin 36, other conventional means for attachment could be utilized.

The downrigger line connector 31 also has a wedge shaped insert 38 illustrated in FIG. 6. The insert 38 has a groove 40 (FIG. 6) running around its periphery, for receiving the downrigger line 14. The insert 38 is adapted to wedge the line between its periphery and the line engaging surfaces 37 on the sides of slot 34 in housing 33 as shown in FIGS. 5 and 8.

In the preferred embodiments, the insert 38 is made of nylon to give it some resiliency. The insert 38 has a protruding end 39 which, in the FIG. 4 and 5 version, extends beyond housing 33 when insert 38 and line 14 are positioned within housing 33. As descried below, this facilitates removal of the insert 38 and downrigger line 14 from the housing 33.

The groove 40 around the periphery of insert 38 is expandable to receive downrigger lines 14 havving a very wide range of tensile strengths. As an example, with one size insert the release assembly can handle downrigger lines ranging from 25 pound test monofilament line to 300 pound test wire line. With a slightly thicker insert, even larger lines, say to 700 pound test, can be used for heavy commercial fishing.

The downrigger line connector 31 also has a sleeve 42 (FIGS. 4, 5, 7 and 8 which is slidably engaged on downrigger line 14. In the form shown in FIGS. 4, 5, one end 45 of the sleeve 42 includes a resilient bumper 48. As shown in FIG. 5, resilient bumper 48 engages wedge clamp 32 when sleeve 42 and wedge clamp 32 are abutting.

Sleeve 42 has a hole 44 through which downrigger line 14 is slidably engaged. Sleeve 42 has opposing ends 45 and 46. It also has a center section 47. The center section 47 has a smaller diamete than ends 45 and 46. While the sleeve 42 is shown as cylindrical, it can be any suitable shape complementary to the opening between legs 23 and 24 of release clamp 20.

Release clamp 20 fits around the center sectin 47 of sleeve 42. The center section 47 has a smaller cross-sectional area than ends 45 and 46 to allow legs 23 and 24 to be slidably engagable around sleeve 42. The larger ends 45 and 46 prevent clamp 20 from sliding off sleeve 42.

Bumper 48 is preferably a resilient plastic to provide shock absorption between sleeve 42 and wedge clamp 32. The bumper 48 has a bore 49, through which downriger line 14 passes. The bore 49 has a diameter large enough to slide over protruding end 39 of insert 38 and downrigger line 14.

As shown in FIGS. 5 and 8, the bumper 48 is resiliently fitted into hole 44 in the sleeve 42. This is merely to allow sleeve 42 and bumper 48 to slide as a unit, and is not necessary to the practice of the invention. The bumper 48 could also be an integral part of sleeve 42, or be provided to slide along the line independently of the sleeve.

An alternative embodiment of the downrigger release assembly is illustrated in FIG. 7 and FIG. 8. In this version the release clamp 20 is the same as was earlier described.

The alternative embodiment also has a wedge clamp 32 and a sleeve 42. However, in this embodiment, the sleeve 42 is an integral part of wedge clamp 32.

The alternative embodiment also has a resilient bumper 48. The bumper 48 in this instance provides resilient shock absorption between sleeve 42 and the downrigger rod 12 when the downrigger line 14 is retracted.

In this version the release assembly 18 has less parts, and requires only one plastic mold, for the wedge clamp 32 and sleeve 42 combination, rather than two. With one less part, the assembly is also easier to package and at attach to the downrigger line 14.

The following description of operation of the release assembly 18 applies to both embodiments.

The entire downrigger assembly 18 as it would actually be utilized is shown in FIG. 4. To attach assembly 18 to downrigger line 14 one would first make a loop in the end of downrigger line 14. If necessary, to prevent fouling, a swage clamp can be fastened around line 14, to hold the end of line 14 back to line 14 itself. Having a swage clamp installed can help prevent the end of downrigger line 14 from becoming fouled with other parts of the downrigger line release assembly 18 when they are installed.

The downrigger line would be threaded through sleeve 42 and bumper 48. It would then be threaded through slot 34 in housing 33. A loop would than be formed in the end of line 14 as shown in FIG. 5.

Once the loop has been formed in the end of downrigger line 14, the insert 38 would be placed within the loop as illustrated in FIG. 5. With the insert 38 placed within the loop, line 14 will be partially engaged in groove 40. The loop in downrigger line 14 with insert 38 in place would then be drawn upward through slot 34 in housing 33 until the insert 38 and line 14 are wedged between line engaging surfaces 37.

As force is exerted on line 14 in the direction of the narrowed portion of slot 34, mechanical pressure as well as friction will keep insert 38 and line 14 locked within slot 34.

As shown in FIG. 4, a stop 53 can be attached to downrigger line 14 to stop the upper sliding motion of sleeve 42. The stop will normally be placed at a spot on line 14 which will put sleeve 42 at the desired depth. As illustrated in FIGS. 4 and 5, the stop 53 utilized is similar to conventional split-shot sinkers commonly used in fishing. However, any type of suitable stop could be utilized.

The release clamp 20 would then be fitted to sleeve 42. In order to do so, legs 23 and 24 would be separated manually so they will fit around the center section 47. The body 21 would be grasped and the legs 23 and 24 placed against sleeve 42. Pressure exerted in the direction of the legs 23 and 24 will cause them to separate and slide around sleeve 42. When weight 16 is installed, this operation can be performed with one hand.

Legs 23 and 24 will have a normal unstretched position when installed around sleeve 42. When in this normal position, sleeve 42 will be slidably engaged between them. The adjustment screw 27 is used to change the distance between legs 23 and 24. If they are closer together than their normal position, sleeve 42 will only be released with more tension in fishing line 13. This means that a strike by a larger fish will be necessary to release fishing line 13. Turning screw 27 clockwise will move legs 23 and 24 closer together. Turning it counterclockwise will allow them to return to their normal position. Release clamp 20 would be attached to a loop in fishing line 13, as illustrated in FIG. 4.

As can be seen from FIGs. 4 and 5 in the first preferred embodiment, when the insert 38 is in position in slot 34 the insert 38 has one protruding end 39 which extends beyond housing 33. This provides a surface against which the fisherman can press in order to remove insert 38 and line 14 from slot 34. Since the downrigger weights 16 may be of considerable weight, the protruding end 39 provides a convenient spot to which to apply force to remove insert 38.

In the alternative embodiment, the protruding end 39 of insert 38 will not extend beyond sleeve 42, as shown in FIG. 7 and FIG. 8. In this case, a tool such as a screwdriver, may be inserted through hole 44 in sleeve 42 and may be pushed against protruding end 39 of insert 38 to remove it from housing 32.

Once the downrigger weight 16 and release clamp 20 with fishing line 13 attached have all been assembled, the entire unit can be lowered into the water until the fishing line is at the desired trolling depth. When a fish strikes the fishing line, causing tension in fishing line 13, release clamp 20 will be resiliently disengaged from sleeve 42. The release clamp 20 will remain with the fishing line 13 and will not be lost. Once the fishing line has been reeled in and the fish landed, the downrigger line 14 can be raised and the release clamp can then be reattached to sleeve 42 and the assembly can again be lowered to the desired trolling depth.

The downrigger line 14 is normally on a power-driven reel. When a fish strikes and the line 14 is released, the downrigger line 14 can then be raised. While the reels normally have an automatic cut-off when tension in the line reaches a certain limit, if they are not manually shut off before the release assembly hits ferrule at the end of the downrigger rod, damage to the ferrule or the release assembly may result.

As the downrigger line 14 is raised, the sleeve 42 of the FIG. 4, 5 version will normally slide down line 14 until it abuts the wedge clamp 32. The advantage of having bumper 48 between sleeve 42 and wedge clamp 32 is that it will compress resiliently when sleeve 42 contacts the ferrule at the end of the downrigger rod. It will also prevent sleeve 42 from contacting wedge clamp 32 or the protruding end 39 of insert 38 with excessive force.

In the alternative embodiment, there is constant "contact" between the sleeve 42 and the wedge clamp 32, since they are part of the same piece, but bumper 48 will prevent damage which could otherwise occur as sleeve 42 is drawn into contact with the downrigger rod.

In compliance with the statue, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A downrigger release assembly for releasably attaching a fishing line and weight to a separate retractable downrigger line extending from a downrigger rod, comprising:

wedge clamp means including a housing adapted to be attached to the weight and having a slot therethrough including converging line engaging surfaces, and a wedge shaped insert receivable within the housing adapted for receiving the downrigger line about its periphery, said insert being receivable within said slot between said converging line engaging surfaces for frictionally clamping said downrigger line between said line engaging surfaces and said insert;

sleeve means adapted to receive said downrigger line;

resilient bumper means slidably engagable about said downrigger line and operationally positioned between said wedge clamp means and said downrigger rod; and release means attachable to said fishing line and releasably attachable to said sleeve means, responsive to tension in said fishing line for release from said sleeve means.

2. The downrigger release assembly of claim 1, wherein said sleeve means is elongaged, having an axial hole therethrough for receiving said downrigger line.

3. The downrigger release assembly of claim 1, wherein said release means includes:
   adjusting means on said release means for changing the responsiveness of said release means to tension in said fishing line.

4. The downrigger release assembly of claim 1, wherein said sleeve means is integral with said wedge clamp means and has an end extending outwardly of said wedge clamp means; and
   wherein said bumper means is at said sleeve end.

5. The downrigger release assembly of claim 1, wherein said sleeve means is independent of said wedge clamp means and includes opposing ends; and
   wherein said bumper meas is at one of said ends such that it is positioned between said sleeve means and said wedge clamp means.

6. A downrigger release assembly for releasably attaching a fishing line and weight to a separate retractable downrigger line extending from a downrigger rod, comprising:
   a wedge clamp housing having a slot therethrough, including converging line engaging surfaces, and means for attaching a weight to said housing;
   a longitudinal wedge-shaped insert adapted to carry the downrigger line about its periphary, said insert receivable within said slot between said converging line engaging surfaces so that said line is clamped frictionally between said line engaging surfaces and said insert when said insert and line are engaged within said slot;
   a sleeve having a hole therethough, said hole adapted to receive said downrigger line;
   resilient bumper means engaged about said downrigger line and operably positioned between said wedge clamp housing and said downrigger rod; and
   an adjustable release clamp adapted for attachment to said fishing line, having a body and two resilient curved legs extending therefrom, each leg having a free end spaced from said body, said legs being resiliently separable to releasably engage the sleeve between them; and
   adusting means on said release clamp for changing the distance between the free ends of said legs.

7. The downrigger release assembly of claim 6 wherein said wedge clamp housing has an end spaced away from said sleeve, and said means for attaching the weight to said housing comprises a clevis and clevis pin assembly at said end of said housing.

8. The downrigger release assembly of claim 6 wherein said slot is angularly oriented in relation to said means for attaching the weight to the housing to allow removal of said insert and downrigger line without removal of said weight.

9. The downrigger release assembly of claim 6 wherein said insert is made of nylon.

10. The downrigger release assembly of claim 6 wherein said adjusting means comprises a screw having a head and a threaded shank with the shank passing through one of said legs adjacent the body and threadably engaged through the order of said legs adjacent said body so that rotation of said shank may result in corresponding movement of the freeleg ends toward or away from one another.

11. The downrigger release assembly of claim 6 wherein said sleeve is an elongated cylinder having a center section with a diameter smaller than the diameter of the ends.

12. The downrigger release assembly of claim 6 wherein said sleeve is an elongated cylinder having a center section with a diameter smaller than the diameter of the ends; and
   wherein said release means is releasably attached to said center section.

13. The downrigger release assembly of claim 6 wherein said insert has an end protruding from said housing when said insert and line are received in said slot.

14. The downrigger release assembly of claim 7 wherein said insert has an end protruding from said housing when said insert and line are received in said slot and wherein said bumper means is comprised of a resilient plastic tube at one end of said sleeve, having a bore coaxial with the hole in said sleeve, said protruding end of said insert resiliently receivable into said bore.

15. The downrigger release assembly of claim 6 wherein said insert is made of nylon and has a groove about its periphery for resiliently receiving said downrigger line.

16. A downrigger line connector for a downrigger release assembly for releasably attaching a fishing line and a weight to a retractable downrigger line and rod, comprising:
   wedge clamp means, including a housing for releasable attachment to the weight and having a slot therethrough including converging line engaging surfaces, and a wedge shaped insert receivable within the slot for releasably receiving the downrigger line about its periphery and for clamping said downrigger line frictionally to said housing against the converging line engaging surfaces of said slot;
   sleeve means for sidably engaging said downrigger line between said wedge clamp means and rod; and
   resilient bumper means operable positioned along the downrigger line between said wedge clamp means and said rod.

17. The downrigger line connector for a downrigger release assembly of claim 17.
   wherein said sleeve means has opposing ends, and is elongated with longitudinal hole therethrough;
   and wherein said resilient bumper means is comprised of a resilient plastic tube at one end of said sleeve, having a bore coaxial with the hole in said sleeve.

* * * * *